United States Patent
Zhu et al.

(10) Patent No.: US 9,639,881 B2
(45) Date of Patent: May 2, 2017

(54) METHOD AND SYSTEM FOR PERSONALIZED VIDEO RECOMMENDATION BASED ON USER INTERESTS MODELING

(71) Applicant: TCL RESEARCH AMERICA INC., Santa Clara, CA (US)

(72) Inventors: Qiusha Zhu, Santa Clara, CA (US); Haohong Wang, Santa Clara, CA (US)

(73) Assignee: TCL RESEARCH AMERICA INC., Santa Clara, CA (US)

(*) Notice: Subject to any disclaimer, the term of this patent is extended or adjusted under 35 U.S.C. 154(b) by 965 days.

(21) Appl. No.: 13/897,465

(22) Filed: May 20, 2013

(65) Prior Publication Data

US 2014/0344103 A1 Nov. 20, 2014

(51) Int. Cl.
*G06Q 30/00* (2012.01)
*G06Q 30/06* (2012.01)

(52) U.S. Cl.
CPC ..... *G06Q 30/0631* (2013.01); *G06Q 30/0623* (2013.01)

(58) Field of Classification Search
CPC ................................... G06Q 30/0601–30/0645
USPC ................................................. 705/26.1–27.2
See application file for complete search history.

(56) References Cited

U.S. PATENT DOCUMENTS

| | | | |
|---|---|---|---|
| 2003/0101187 A1* | 5/2003 | Gaussier | G06F 17/3071 |
| 2009/0055385 A1* | 2/2009 | Jeon | H04N 5/44543 |
| 2011/0270678 A1* | 11/2011 | Drummond | G06Q 30/02 705/14.52 |

OTHER PUBLICATIONS

André Gaudreault. (1990). Filmographic analysis and early cinema. Canadian Journal of Film Studies (Archive), 1(1), 57-73,93. Retrieved from https://search.proquest.com/docview/222752000?accountid=14753.*

* cited by examiner

*Primary Examiner* — Resha Desai
(74) *Attorney, Agent, or Firm* — Anova Law Group, PLLC

(57) ABSTRACT

A method is provided for personalized video recommendation based on user interests modeling. The method includes detecting a viewing activity of at least one user of a content-presentation device capable of presenting multiple programs in one or more channels, and representing user interests of the at least one user by using a topic model. The method also includes discovering the user interests from user viewing histories, and generating a personalized video list of personalized video contents. Further, the method includes recommending the personalized video contents to the at least one user; and delivering the recommended personalized video to the at least one user such that the personalized video contents are presented on the content-presentation device.

17 Claims, 6 Drawing Sheets

600

METHOD AND SYSTEM FOR PERSONALIZED VIDEO RECOMMENDATION BASED ON USER INTERESTS MODELING

FIELD OF THE INVENTION

The present invention relates to the field of video filtering and recommendation technologies and, more particularly, to techniques for personalized video recommendation based on user interests modeling.

BACKGROUND

With the huge amount of video data uploaded to the Internet every day, how to analyze users' interests and to recommend videos that the users are potentially interested in is a big challenge. Most content-based recommendation systems limit the content to metadata associated with videos, which could lead to poor recommendation results since the metadata is not always available or correct. For these videos, either a lot of efforts need to be spent in manually annotating them or automatically tagging methods have to be applied, otherwise these systems would fail to recommend personalized videos.

On the other hand, visual contents of videos containing information of different granularity, from the whole video to portions of a video and to an object in a video, are not fully explored.

The disclosed methods and systems are directed to solve one or more problems set forth above and other problems.

BRIEF SUMMARY OF THE DISCLOSURE

One aspect of the present disclosure includes a method for personalized video recommendation based on user interests modeling. The method includes detecting a viewing activity of at least one user of a content-presentation device capable of presenting multiple programs in one or more channels, and representing user interests of the at least one user by using a topic model. The method also includes discovering the user interests from user viewing histories, and generating a personalized video list of personalized video contents. Further, the method includes recommending the personalized video contents to the at least one user; and delivering the recommended personalized video to the at least one user such that the personalized video contents are presented on the content-presentation device.

Another aspect of the present disclosure includes a system for personalized video recommendation based on user interests modeling. The system includes a video content, a data storage, an interest representation module, an interest discovery module, a recommendation generation module, a watch history, user behaviors, and recommended items. The data storage is configured to store video data and/or the metadata of the video data. The interest representation module is configured to represent user interests of at least one user by using a topic model. The interest discovery module is configured to discover the interests from user viewing histories. The recommendation generation module is configured to generate a personalized recommendation list and to transmit the personalized recommendation list to the at least one user. The video content may include any appropriate type of source for video contents and may contain various video sources. The watch history may include any appropriate viewing history of the user(s). The user behaviors may include any appropriate user behavior data, such as logical operation (e.g., zapping, inter-page navigation), physical operation (e.g., pressing buttons, swinging remote), etc.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

Figure 1:
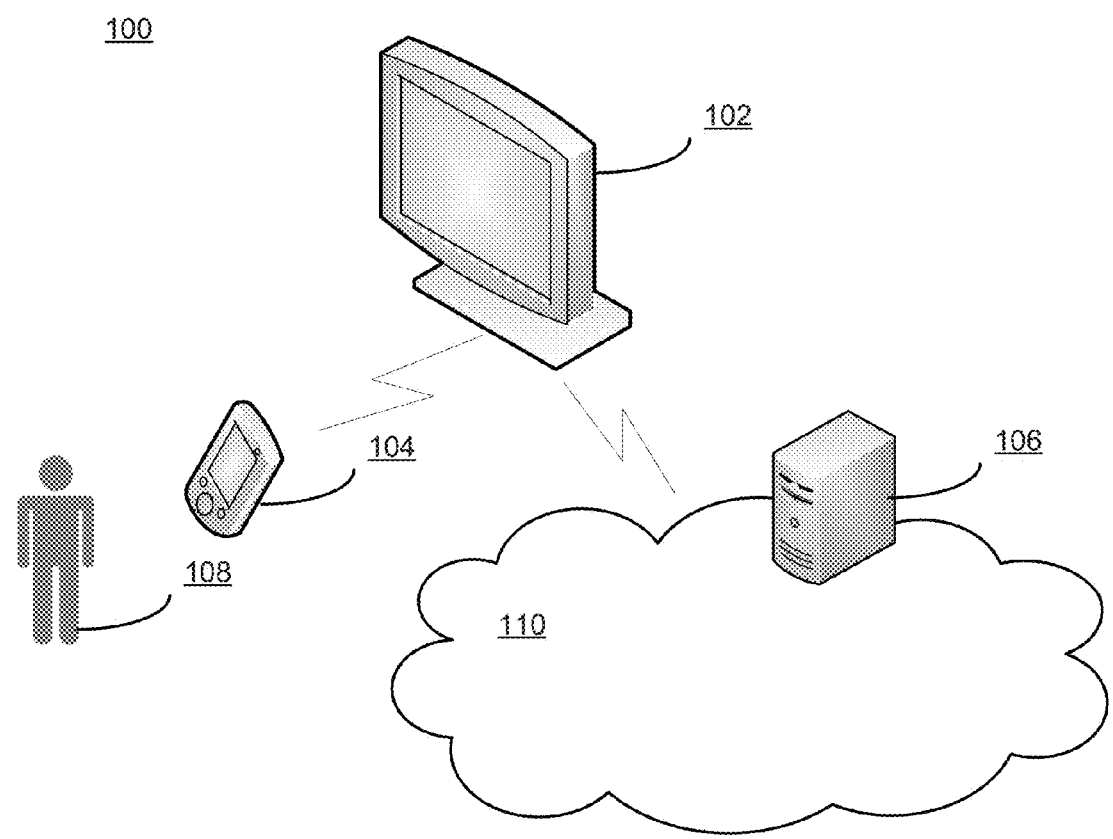
FIG. 1 illustrates an exemplary environment incorporating certain embodiments of the present invention.

FIG. 1 illustrates an exemplary environment 100 incorporating certain embodiments of the present invention. As shown in FIG. 1, environment 100 includes a television set (TV) 102, a remote control 104, a server 106, a user 108, and a network 110. Other devices may also be included.

TV 102 may include any appropriate type of TV, such as plasma TV, LCD TV, projection TV, non-smart TV, or smart TV. TV 102 may also include other computing system, such as a personal computer (PC), a tablet or mobile computer, or a smart phone, etc. Further, TV 102 may be any appropriate content-presentation device capable of presenting multiple programs in one or more channels, which may be controlled through remote control 104.

Remote control 104 may include any appropriate type of remote control that communicates with and controls the TV 102, such as a customized TV remote control, a universal remote control, a tablet computer, a smart phone, or any other computing device capable of performing remote control functions. Remote control 104 may also include other types of devices, such as a motion-sensor based remote control, or a depth-camera enhanced remote control, as well as simple input/output devices such as keyboard, mouse, and voice-activated input device, etc.

Further, the server 106 may include any appropriate type of server computer or a plurality of server computers for providing personalized contents to the user 108. The server 106 may also facilitate the communication, data storage, and data processing between the remote control 104 and the TV 102. TV 102, remote control 104, and server 106 may communicate with each other through one or more communication networks 110, such as cable network, phone network, and/or satellite network, etc.

The user 108 may interact with TV 102 using remote control 104 to watch various programs and perform other activities of interest, or the user may simply use hand or body gestures to control TV 102 if motion sensor or depth-camera is used by TV 102. The user 108 may be a single user or a plurality of users, such as family members watching TV programs together.

Figure 2:
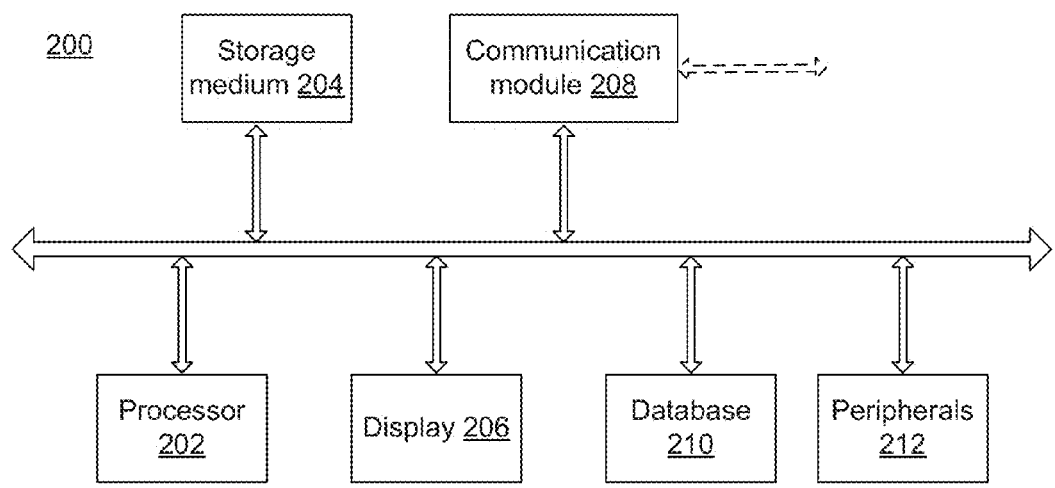
FIG. 2 illustrates an exemplary computing system consistent with the disclosed embodiments.

TV 102, remote control 104, and/or server 106 may be implemented on any appropriate computing circuitry platform. FIG. 2 shows a block diagram of an exemplary computing system 200 capable of implementing TV 102, remote control 104, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

Figure 3:
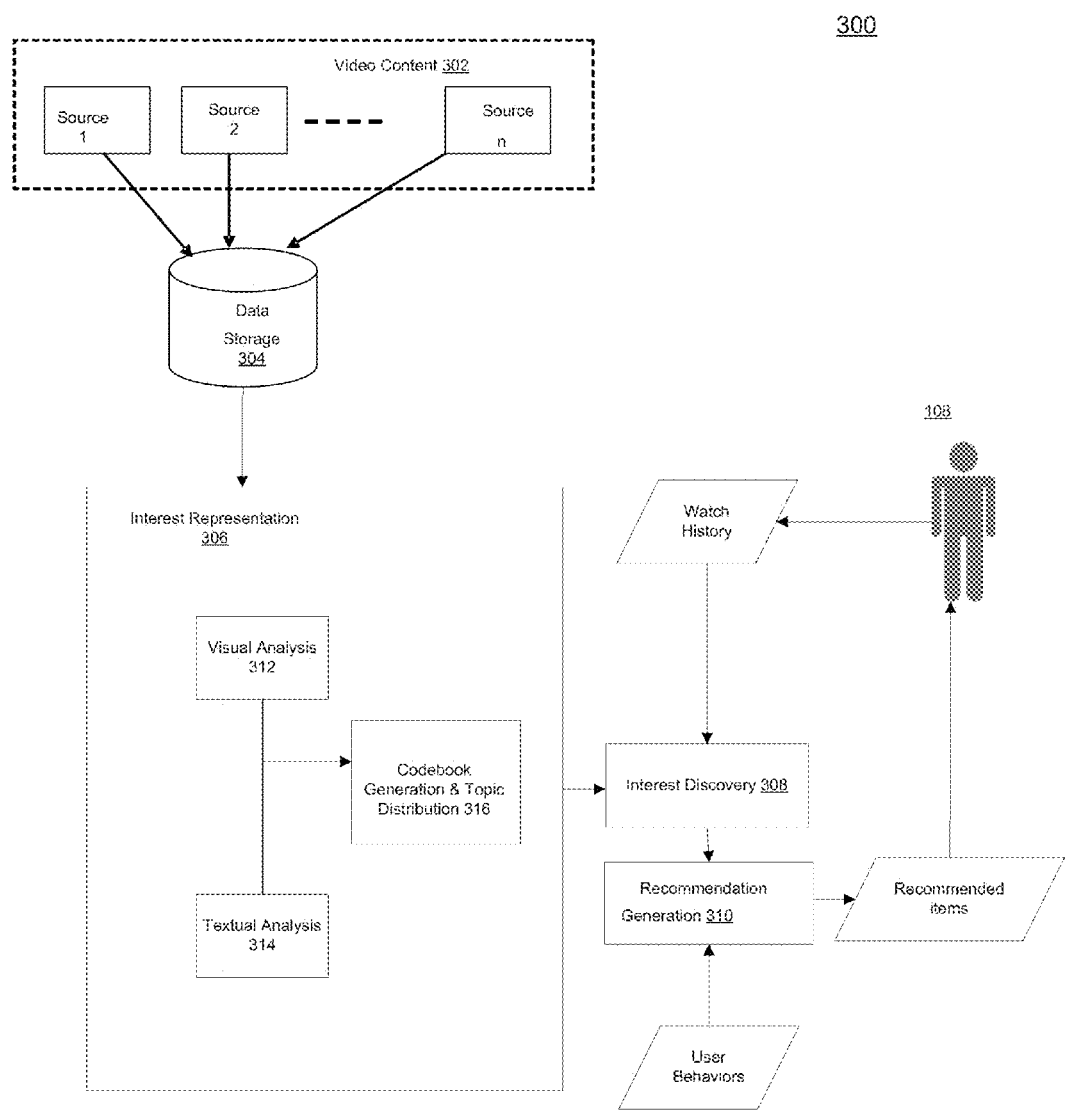
FIG. 3 illustrates an exemplary personalized video recommendation system consistent with the disclosed embodiments.

TV 102, remote control 104, and/or server 106 may implement a personalized video recommendation system for recommending personalized video to user 108. FIG. 3 illustrates an exemplary personalized video recommendation system 300 consistent with the disclosed embodiments.

As shown in FIG. 3, personalized video recommendation system 300 includes video content 302, data storage 304, interest representation module 306, interest discovery module 308, recommendation generation module 310, watch history 318, user behaviors 320, and recommended items 322. Certain components may be omitted and other components may be added.

The video content 302 may include any appropriate type of source for video contents and may contain various video sources (i.e., video source 1, video source 2, . . . video source n). The contents from the video content 302 may include both video data and metadata.

The Further, data storage 304 may include any appropriate storage medium (e.g., storage medium 204, database 210) to store video data and/or the metadata of the video data. The video data may be coded before being stored in the data storage 304.

The watch history 318 may include any appropriate viewing history of the user(s). For example, the watch history 318 may include videos that the user recently watched. The user behaviors 320 refers to how a user performs video content exploration and video content search. The content exploration is the way that people encounter new content and the actions and the decisions that people undertake to watch the content. The user behaviors 320 may include any appropriate user behavior data, such as logical operation (e.g., zapping, inter-page navigation), physical operation (e.g., pressing buttons, swinging remote), etc. The recommended items 322 refers to recommended video contents.

The interest representation module 306 can be further divided into three submodules: visual analysis 312, textual analysis 314, and codebook generation and topic distribution 316. The interest representation module 306 is configured to represent the user interests by using a topic model. Then the user interests representation is provided as the input of interest discovery module 308 to calculate the topic distribution of interests at any time stamp or time slot. All tasks can be done offline to compute the topic distribution of each video. The interest discovery module 308 is configured to discover the interests based on the input and the user's viewing histories from watch history 318.

For a new user, the interests are learned online as the new user is watching the videos, while for an existing user, the interests can be calculated from the existing user's watch history and save to a database to avoid recalculating each time. After knowing the user's interests, a personalized recommendation list can be generated by recommendation generation module 310, which maximizes the recommendation accuracy constrained by a set of other criteria such as coverage, diversity, and novelty.

There commendation generation module 310 may utilize user behaviors collected from the viewer's personal device by remote control usage pattern, etc. Based on information from the viewer discovery module 308 and user behaviors, the recommendation generation module 310 may generate a personalized recommendation list and to transmit the personalized recommendation list to the user 108 (e.g., to TV 102). That is, once the personalization detection is done, the recommendation generation module 310 may be configured to handle video content selection and to recommend preferred contents for the user 108.

In certain embodiments, the recommendation generation module 310 may further provide video content selection and recommendation information to the user according to various constraints from the user 108, such as a home network condition, a terminal condition, a video-on-demand (VOD) service subscription, etc., and/or from a service provider or server 106, such as a regional constraint and cloud computational capability constraint, etc.

In certain embodiments, for a particular user 108, a program channel can be configured to adaptively discover the user's viewing preferences, to recommend video contents to the user, and to deliver the personalized video contents to the user over that particular channel.

In other words, from the user's perspective, the personalization process is transparent and the user can view the personalized video contents, from all or certain sources available to the user, without interrupts by commercials or advertisement. The better condition (e.g., more available sources) the user has, the better quality of personalized contents (e.g., chosen from more available sources) are shown on the screen, without any significant user input.

Figure 4:
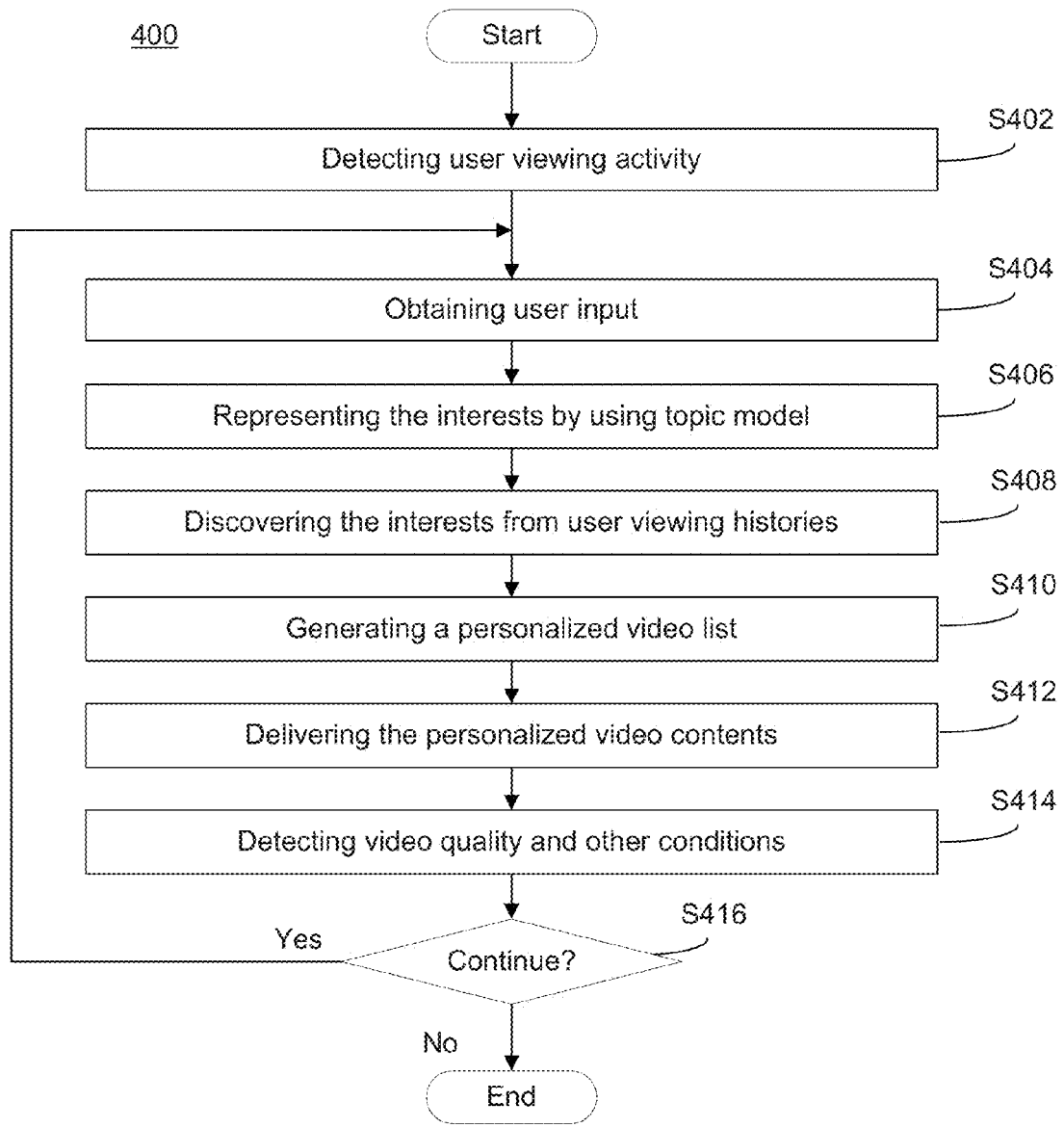
FIG. 4 illustrates an exemplary personalized video recommendation process consistent with the disclosed embodiments.

In operation, personalized video recommendation system 300 may perform certain processes to recommend personalized contents to users. FIG. 4 illustrates an exemplary process 400 for recommending personalized video to users.

As shown in FIG. 4, at the beginning, a user viewing activity may be detected (S402). For example, the user may turn on TV 102, pick up remote control 104, or use other devices (e.g., a smart phone, a tablet, etc.) to communicate with TV 102 or server 106. After the user activity is detected, video contents and user behaviors may be obtained (S404).

If the user just turns on TV, certain program selection of the user may also be obtained. Content characteristics (e.g. title, director, actors, rating, etc.) play a role in the program selection process. The title is often the first captured characteristic. The actors, popularity rating, year and duration also play a role in the decision making process. The user behaviors may include logical operation (e.g., zapping, inter-page navigation), physical operation (e.g., pressing buttons, swinging remote), etc.

Further, the interest of the user or users may be represented by using a topic model (S406). Bag of words (BoW) model is a model used in information retrieval (IR). It is introduced in document classification which models a document as a collection or a bag of words regardless of grammar and word order, thus a document can be represented by a sparse histogram over the vocabulary. The assumption that each word is independent might be over simplified. If treating images as documents and image features/patches as words, an image can be represented by a bag of visual words which is a sparse histogram over a vocabulary of image patches. Thus, a combined vocabulary $V=(w_1, \ldots, w_V)$ can be generated from a video collection, which contains both textual words from metadata and visual words from raw video images. The visual and textual analysis may be implemented by visual analysis 312 and textual analysis 314.

To generate the codebook, visual and textual analysis need to be performed on the video collection first. In visual analysis, each video is divided into shots by shot boundary detection methods, then visual features are detected from the keyframes of the shots, and each keyframe is represented by several local patches.

Scale-invariant feature transform (SIFT) is one of the most famous descriptors that can handle intensity, rotation, scale and affine variation to some extent. SIFT converts each patch to a vector of 128 dimensions, and each keyframe is now represented by a bag of 128-dimensional vectors, where each vector is considered to be independent. Then clustering is performed on the vectors from all the keyframes to group visually similar patches into the same group. The centers of the clusters are defined as visual words and the number of the clusters is the size of the visual vocabulary. After clustering, a cluster membership is assigned to each patch of a keyframe and a keyframe can be represented by a histogram of visual words.

By adding the histograms of the keyframes from the same video, a video can be represented by a histogram of visual words. A portion of a video can also be represented in the same way by only taking the keyframes in this portion into account. Compared to the visual codebook generation process, the generation of textual codebook is fairly straightforward. The typical filter steps such as stop words removal, synonym expansion, and stemming are necessary in the textual analysis. Then the final forms of terms are considered as the words in the textual codebook, and the metadata associated with a video can also be mapped to a histogram of textual words. By combining visual and textual codebook, a video can be represented by a histogram of a single combined codebook with size V.

Video scenes may be used when analyzing user's interests in a portion of a video, which are referred as scene-level interests. Interests in an object appeared in a video are referred as object-level interests, and can be analyzed in a similar manner as scene-level interests.

Generally speaking, an image usually contains several different scenes, analog to multiple topics of a document. Hence it is natural to apply topic models in text mining to tackle the multiple scene problems in images.

Given a large collection of unstructured documents, as a type of statistical model, a topic model can uncover the underlying semantic structure of the corpus and automatically discover the latent topics in it. Each topic is a cluster of words that frequently occur together and each document exhibits these topics with different proportions.

Probabilistic latent semantic analysis (pLSA) and latent dirichlet allocation (LDA) are two representative topic models that may be used. Compared to LDA, pLSA may be not scalable because it fixes the topic mixture probability for documents once the model is estimated, and needs to re-estimate the model when new documents arrive.

In contrast, LDA represents a document as random mixtures over latent topics, denoted as $Z=(z_1, \ldots, z_k, \ldots, z_K)$, where K is the total number of topics, and each topic $z_k$ is characterized by a distribution over words.

LDA assumes that words are exchangeable within each document and documents are exchangeable within the corpus. Considering this strong assumption of LDA, several topic models such as correlated topic model (CTM) and dynamic topic model (DTM) are developed based on LDA to loose these constraints or extend it to adapt to particular situations.

Although LDA is used herein as the basic form of these variants, other methods based on LDA may also be used. An image can also be considered as a mixture of latent scenes, and a scene is a mixture of visual words. In certain embodiments, topic may be used in general to stand for both scenes of keyframes and topics of metadata. LDA can model each video as a mixture of topics while each topic is a mixture of words in the combined vocabulary. The topic distribution of a video and the word distribution of a topic can therefore be estimated.

A user's interests are also modeled as a mixture of topics. Thus the interests can be estimated according to the user's history (S408). However, a user's interests are usually evolving over time and, even at the same time, the interests are multifaceted, which means the user could have preferences on multiple topics. This characteristic can be captured by a distribution over topics that estimated from the user's just watched video or a portion of a video and some of the user's previous interests.

In other words, the interests distribution over topics at the current time stamp from the just watched (portions of) video and the interests at the previous time stamp to the interests of a certain previous time stamp can be predicted. The number of considered previous time stamps is varied for different users.

For example, if a user's interests change often relates to the number of watched videos, the end point of the considered previous interests should be far from the start point which is the first previous interests. Therefore, a larger window size or a longer memory length of the time-varying interests could better capture the overall interests distribution in order to make prediction.

To the contrary, if the user's interests are consistent during a period of time, then the length from the start point to the end point could be short since a small window size can already provide enough information about the user's interests.

Figure 5:
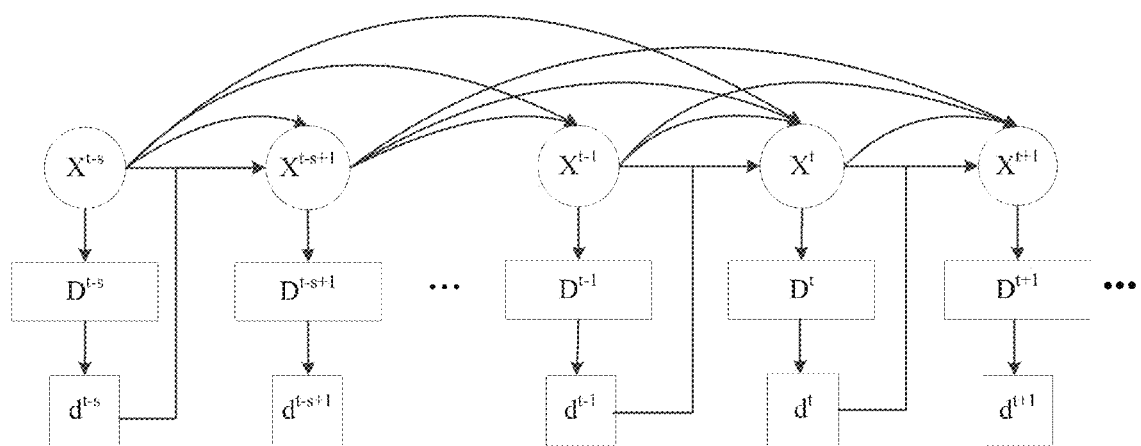
FIG. 5 illustrates an exemplary Markov chain of a user's interests change over time consistent with the disclosed embodiments.

In probability, Markov chain is used to model the visible state of a system with a random variable that changes through time. If treating a user's interests at a particular time stamp as a random variable, then it can be modeled as a Markov chain of orders, where s is the window size or memory length and is finite. FIG. 5 illustrates Markov chain of a user's interests change over time As shown in FIG. 5, the user's current interests is determined based on the previous s interests and the just watched (portions of) video.

Suppose a list $D^{t-1}$ containing top n recommended videos is given to a user, and the probability of choosing video $d_j^{t-1}$ from $D^{t-1}$ is generally estimated to be proportional to the rank of $d_j^{t-1}$ in $D^{t-1}$. It can be expressed in mathematic form as $P(d_j^{t-1}|r)=R(r)$ where r is the rank of $d_j^{t-1}$ in $D^{t-1}$ and $R(r)$ is a monotonically decreasing function.

At time stamp t, a user's interests is denoted as $X^t$ which can be considered as a mixture of topics, thus to estimate $X^t$ is to estimate $P(z_k|X^t)$ according to $P(z_k|X^{t-1}), \ldots, P(z_k|X^{t-s})$ and $P(z_k|d_j^{t-1})$.

Note the visual words in $d_j^{t-1}$ could be a subset of the visual words contained in the whole video since a user may watch portions of the video. By allowing $d_j^{t-1}$ to count the visual words that actually occur in the portions that have been watched, interests can be captured at different granularity.

A recommendation system or a recommendation algorithm may be evaluated or optimized based on multiple criteria that may affect user experience. For example, user study may be used to evaluate a recommendation system. However, the user study approach may have a small sample size/area. In certain embodiments, offline evaluations may be used for evaluating a recommendation system. The offline evaluation may be performed based on accuracy, coverage, diversity, novelty, serendipity, trust and robust.

Accuracy may be used as a primary criterion, and the remaining can act as constraints when trying to maximizing the recommendation accuracy. Thus, the generation of a recommendation list $D^t$ can be generalized into solving the below Equation (1) (S410).

$F=(f_1, \ldots, f_C)$ is a set of constraints where C is the total number of constraints in set F. $f_c(D^t)>0$ is a general form of a constraint function.

$$\arg\max \text{Accuracy}(D^t)$$

$$\text{s.t. } f_c(D^t)>0, f_c \in F \quad (1)$$

Based on the reasonable assumption that if a user is more interested in a video, this video is more likely to be watched. Thus recommending a list of videos that most fit the user's interests should result in the highest recommendation accuracy.

The problem of optimizing recommendation accuracy may then be mapped to find a set of videos $D^t$ with topic distribution the same to or as close as the topic distribution of the user's interests $X^t$, that is minimizing the difference between $P(\text{topics}|D^t)$ and $P(\text{topics}|X^t)$, which is defined by:

$$\arg\max \text{Accuracy}(D^t)=\arg\min |P(\text{topics}|D^t)-P(\text{topics}|X^t)| \quad (2)$$

However, recommendation systems are centered around users which indicate that users' satisfaction is a primary criterion for recommendation systems. Thus, when designing a recommendation system, criteria beyond accuracy such as coverage, diversity and novelty are also needed from users' perspective.

For example, Matthew effect exists in many collaborative recommendation systems, which means popular items get more popular over time, and less popular items get even less popular. This is obviously an issue to content providers because if their items are not popular at the beginning, it is likely that these items will never get the chance to be recommended to the users.

Coverage is used as a criterion to measure the ability of recommendation systems to cover less popular or the so called long-tail items. The measurement for coverage is described using Gini Index, as showed in Equation (3).

$\text{pop}(d_j^t)$ is the proportion of item $d_j$ at time stamp t accounted for total user choices. A system has Matthew effect if the value $\text{Gini}(D^t)$ of the recommended list $D^t$ is larger than that of a user's watch history, denoted as $\text{Gini}(\text{Hist}^t)$.

Therefore, to ensure coverage of a recommendation system, the difference between $\text{Gini}(D^t)$ and $\text{Gini}(\text{Hist}^t)$ has to be lower than certain threshold.

$$\text{Gini}(D^t) = \frac{1}{n-1} \sum_{d_j^t \in D^t} (2j-n-1)\text{pop}(d_j^t) \quad (3)$$

$$\text{Coverage}(D^t) = \text{Gini}(D^t) - \text{Gini}(\text{Hist}^t)$$

Diversity can be divided into intra-list diversity and inter-list diversity. The intra-list diversity refers to how different the recommended items are with respect to each other, while the inter-list diversity refers to how different a recommendation list is with respect to another recommendation list. In certain embodiments, the intra-list diversity is used to analyze the recommendation of a particular user.

A common definition of intra-list diversity uses the average pairwise dissimilarity or distance between recommended items, also called intra-list distance. The diversity of a recommendation list $D^t$ can be calculated by Equation (4). $\text{dis}(d_i^t, d_j^t)$ is a distance function that measures the dissimilarity between two items $d_i^t$ and $d_j^t$. Various metrics can be used such as Euclidean distance, Mahalanobis distance, Manhattan distance, and etc.

$$\text{Diversity}(D^t) = \frac{2}{n \times (n-1)} \sum_{d_i^t, d_j^t \in D^t} \text{dis}(d_i^t, d_j^t) \quad (4)$$

Novelty is often related to diversity in that when a list is diverse, each item is novel compared to the rest of the recommended items. However, the novelty as used herein maybe an item to a user, that is, an item is novel with respect to what has been previously seen by a user. To be more general, the context information of a user may be used instead the user's history because the user may have not seen an item but have partial information about it from somewhere else.

An item is considered to have a high novelty value if it exists in the context of few users, and have a low novelty value if it is popular. The novelty of a recommended list can be defined as the summation of the novelty of each of its items, as shown in Equation (5), where a large distance indicates a high novelty value.

The novelty of an item $d_j^t$ is in proportion to its distance between the items in a user's context $\Omega$. $P(d_i|d_j^t,\Omega)$ is the probability of choosing $d_i$ given $\Omega$ and $d_j^t$, and can be treated as coefficient.

$$\text{Novelty}(d_j^t) = \sum_{d_i \in \Omega} P(d_i | d_j^t, \Omega)\text{dis}(d_i, d_j^t) \quad (5)$$

$$\text{Novelty}(D^t) = \sum_{d_j^t \in D^t} \text{Novelty}(d_j^t)$$

Other criteria like serendipity, trust and robust are not explained one by one in details here. Similarly, trust and robust may be represented using certain metric and incorporated into the optimization process. The purpose of introducing the above described criteria is to convey the concept that recommendation is a single objective problem under certain constraints. A set of criteria impose constraints when a recommendation system try to optimize its recommendation accuracy.

Equation (6) is a specific form of Equation (1) if limit constraints to coverage, diversity and novelty, which are expressed in Equation (3) (4) (5). $Th_C$, $Th_D$ and $Th_N$ are the thresholds for minimum coverage, diversity, and novelty, respectively.

arg max Accuracy($D^t$)

s.t. Coverage($D^t$)≥$Th_C$

Diversity($D^t$)>$Th_D$

Novelty($D^t$)>$Th_N$ (6)

At the beginning, the topic distribution of a video P(topics|$d_j$) and the topic distribution of the current interests P(topics|$X^t$) need to be calculated to solve Equation (2). Then the optimization problem defined in Equation (6) can be solved by Equation (2).

Figure 6:
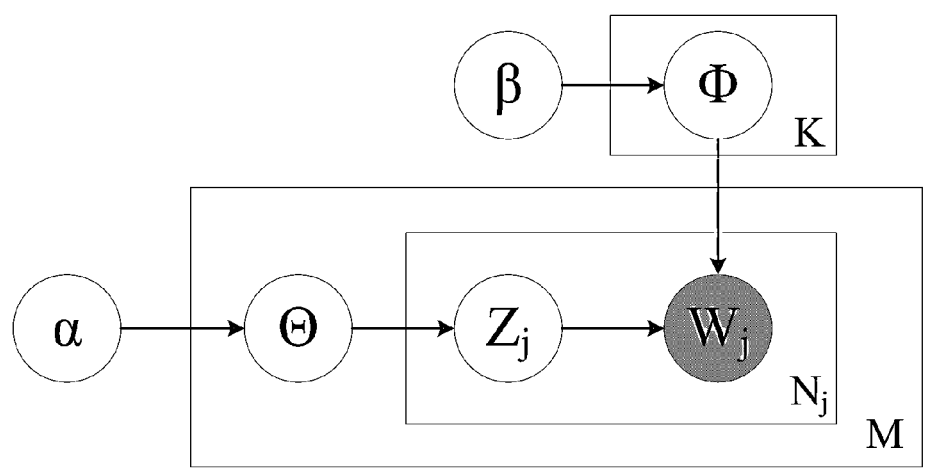
FIG. 6 illustrates an exemplary plate notation for smoothed latent dirichlet allocation (LDA) consistent with the disclosed embodiments.

Assuming that K is defined as independent topics for a video collection D of size M, each video in D is also independent from each other. FIG. 6 is the plate notation of smoothed LDA, where the boxes are 'plates' representing replicates, shaded circles are observed variables and unshaded circles are unobserved or the so called latent variables. A video $d_j$ that contains $N_j$ words is represented by vector $W_j$ of dimension $N_j$, which is the only observed variable. Notations in the figure are explained as follows: α is the K-dimensional parameter of $\theta_j$, which means the prior weights a video over K topics; β is the V-dimensional parameter of $\phi_k$, which means the prior weights a topic over V words; θ is the M*K matrix where each row $\theta_j$ is the Dirichlet distribution of video $d_j$ over total K topics; φ is the K*V matrix where each row $\phi_k$ is the Dirichlet distribution of topic $z_k$ over total V words; $W_j$ is a $N_j$ vector for $d_j$ where each element $w_{ji}$ (denotes the a word in V) is a multinomial distribution with parameter $\phi_{Z_{ji}}$; $Z_j$ is a $N_j$ vector for $d_j$ where each element $z_{ji}$ (denotes the topic for word $w_j$i) is a multinomial distribution with parameter $\theta_j$.

To learn the topic distribution of all words in all videos is to learn P($Z_j$|$W_j$; α,β) for each video. This can be solved by collapsed Gibbs sampling, which integrates out θ and φ. Since the prior weights α and β are predefined random or empirical values, P($Z_j$|$W_j$; α,β) can be denoted as P(Z|W) for simplicity. Thus for any video $d_j$, P(ZαW) provides its distribution on a topic P($z_k$αW), where k∈[1,K].

Since both $X^t$ and $d_j^t$ are mixtures of K topics, the distribution of $X^t$ on topics can be estimated in different ways. For example, one way is shown in Equation (7) which combines the distributions linearly with parameter Θ=($\theta_0$, . . . , $\theta_s$), a bias parameter β, and a regularization parameter λ, subject to $$\beta + \sum_{l=0}^{l=s} \theta_l = 1.$$

is learned in interest representation, where $d_j^{t-1}$ is interchangeable to W in P($z_k$|W), both means the occurrence vector of words. At the initial time stamp t=0, $X^0$ is empty, and P($z_k$|$X^1$) is equal to the topic distribution of the first watched video P($z_k$|$d_j$), which is defined by:

$$P(z_k \mid X^t) = \beta + \theta_0 P(z_k \mid d_j^{t-1}) + \theta_1 P(z_k \mid X^{t-1}) + \quad (7)$$

$$\theta_2 P(z_k \mid X^{t-2}) + \ldots + \theta_s P(z_k \mid X^{t-s}) + \lambda \sum_{l=0}^{l=s} \theta_l^2$$

Common choices of Θ, uniform distribution and time decay distribution, are shown in the below Equation (8) (9), respectively. But it can also be learned from users' feedbacks.

$$\Theta_l = \frac{1-\beta}{s+1} \quad (8)$$

$$\Theta_l = \frac{l}{\exp(-\gamma * (l+1))} \quad (9)$$

where γ is a parameter that determines the shape of the decay.

After learning the topic distribution of each video in interest representation, and estimating the topic distribution of interests in interest discovery, the optimization problem depicted in Equation (1) can be formalized into Equation (10) subject to $D^t \cup D_F$, which is another expression way of $f_c(D^t) > 0$, c∈[1,C]. $D_F$ denotes all the subsets of the video collection D that satisfy the constraints F. If using the specific version as shown in Equation (6), $D_F$ are all the subsets that meet the requirement of minimum coverage, diversity and novelty. $z_k$, k∈[1,$\hat{K}$], where $\hat{K} \leq K$ is the number of selected topic for recommendation, and $D^t=(d_1^t, \ldots, d_{\hat{n}}^t)$, where $\hat{n}$ is the size of a subset in $D_F$.

By minimizing the cost function $Y^t$ which is equivalent to Equation (2), not only positive topics (topics that a user likes) are captured, negative topics (topics that a user dislikes) can also be captured.

$$\operatorname{argmin}_{D^t \subset D_F} Y^t = \operatorname{argmin}_{D^t \subset D_F} \sum_{k=1}^{k=\hat{K}} |P(z_k \mid D^t) - P(z_k \mid X^t)| \quad (10)$$

Under the previous assumption that videos are independent from each other, as derived in Equation (11), the distribution of $D^t$ on topic $z_k$ is only determined by the distributions of the $\hat{n}$ videos on $z_k$ and their prior probabilities.

$$P(z_k \mid D^t) = \frac{P(D^t \mid z_k) \times P(z_k)}{P(D^t)} \quad (11)$$

$$= \frac{P(d_1^t, \ldots, d_{\hat{n}}^t \mid z_k) \times P(z_k)}{P(d_1^t, \ldots, d_{\hat{n}}^t)}$$

$$= \frac{\left(\prod_{j=1}^{j=\hat{n}} P(d_j^t \mid z_k)\right) \times P(z_k)}{\prod_{j=1}^{j=\hat{n}} P(d_j^t)}$$

$$= \frac{\left(\prod_{j=1}^{j=\hat{n}} \frac{P(z_k \mid d_j^t) \times P(d_j^t)}{P(z_k)}\right) \times P(z_k)}{\prod_{j=1}^{j=\hat{n}} P(d_j^t)}$$

If given prior information about video consumption, such as viewed statistics of the videos from the user behavior data, $P(d_j^t)$ can be estimated more accurately, else a uniform distribution can be used to model $P(d_j^t)$ in general. The same to $P(z_k)$, without any domain knowledge, it is only reasonable to assume that each topic is evenly distributed.

To simplify the expression, uniform distribution is used to both $P(d_j^t)$ and $P(z_k)$, thus Equation (11) is proportional to Equation (12), and Equation (10) can be reformulated into Equation (13).

$$P(z_k \mid D^t) \propto \frac{\prod_{j=1}^{j=\hat{n}} P(z_k \mid d_j^t) \times P(d_j^t)}{\sum_{j=1}^{j=\hat{n}} P(d_j^t)} \propto \prod_{j=1}^{j=\hat{n}} P(z_k \mid d_j^t) \quad (12)$$

$$\mathrm{argmin}_{D^t \subset D_F} Y^t = \mathrm{argmin}_{d_j^t \in D^t, D^t \subset D_F} \sum_{k=1}^{k=\hat{K}} \left| \sum_{j=1}^{j=\hat{n}} P(z_k \mid d_j^t) - P(z_k \mid X^t) \right| \quad (13)$$

Equation (13) is a combinatorial optimization problem. The optimal solution can be interpreted as finding a set $D^t$ in $D_F$ that minimizes the cost function $Y^t$. If computation power is enough with respect to the size of the video collection, exhaustive search can be applied to find the optimal subset. However, in many situations, this approach is not feasible, especially given the enormous videos nowadays.

From users' point of view, recommendation is represented as a list of recommended items, and higher rankings indicate stronger recommendations. The ordered list underlies an implicit constraint that the first recommended item should have the least difference to a user's interests in regarding to their topic distributions. That is $$\sum_{k=1}^{k=\hat{K}} |P(z_k \mid d_1^t) - P(z_k \mid X^t)| \leq$$

$$\sum_{k=1}^{k=\hat{K}} |P(z_k \mid d_2^t) - P(z_k \mid X^t)| \leq \ldots \leq \sum_{k=1}^{k=\hat{K}} |P(z_k \mid d_{\hat{n}}^t) - P(z_k \mid X^t)|.$$

With this constraint, a sub-optimal solution is shown in Equation (14) which breaks a product into a summation. $P(z_k \mid d_j^t)$ is learned in interest representation and $P(z_k \mid X^t)$ is estimated in interest discovery. If treating the sum of their difference on $\hat{K}$ topics $$\sum_{k=1}^{k=\hat{K}} |P(z_k \mid d_j^t) - P(z_k \mid X^t)|$$

as the cost $v_j$ of video $d_j^t$, and a weight $w_{jc}$ is the weight of $d_j^t$ under the c-th constraint.

Equation (14) is a multidimensional 0-1 knapsack problem as defined in Equation (15). It is shown to be NP-hard, using dynamic programming can solve it in pseudo-polynomial time.

$$\mathrm{argmin}_{D^t \subset D_F} Y^t = \mathrm{argmin}_{d_j^t \in D^t, D^t \subset D_F} \sum_{j=1}^{j=n} \sum_{k=1}^{k=\hat{K}} |P(z_k \mid d_j^t) - P(z_k \mid X^t)| \quad (14)$$

$$\min \sum_{j=1}^{j=M} v_j x_j, \; x_j \in \{0, 1\}$$

$$\text{s.t.} \; f_c(w_{jc} x_j) > 0, \; c \in [1, C], \; j \in [1, M] \quad (15)$$

Thus, the programs may be selected as the preferred for recommendation to the user or users. The user or users may select any recommended video contents to watch, or may wait for the recommended contents to start without any further action or selection.

Returning to FIG. 4, after generating a personalized video list (S410), based on the content recommendation and/or user selection, the system 300 may deliver the personalized video contents to the user (S412). For example, the system 300 may generate video stream based on the personalized video list. The video stream may then be transmitted to the TV 102 and the user or users. TV 102 may present the video stream in a single dedicated channel for the personalized contents. That is, the personalized contents may be recommended and presented in a single channel such that the user can view the preferred programs without moving from channel to channel. Of course, multiple channels may also be used to present the personalized contents.

In addition, the video stream may be generated based on certain conditions from the user or users. For example, in regions with low network bandwidth, the high-definition (HD) content may be unsuitable, and transcoding may be performed by server 106 to guarantee the received video streaming can playback smoothly and in a reasonable viewing condition. Other conditions may also be used to configure the video stream.

Further, additionally or optionally, the system 300 may detect video quality and other related conditions (S414). For example, the system 300 may probe the network condition of a household and the capability of the devices that the family members are using, thus the constraints of streaming quality and content resolution are considered in the recommendation content selection. Such conditions are feedback to the system 300 such that the contents can be configured within the constraint of the conditions.

The system 300 may also determine whether the user continues viewing the personalized content channel (S416). If system 300 determines that the user continues the personalized content delivery (S416, Yes), the process 400 continues from S404. On the other hand, if system 300 determines that the user does not want to continue the personalized content delivery (S416, No), the process 400 completes.

By using the disclosed systems and methods, advantageous personalized content delivery applications may be implemented to replace the current content model with a no-fee model by using content discovery technology built on top of the possible available on-demand streaming video subscriptions of the users.

The disclosed systems and methods provide a new scheme of TV channel with a unique combination of personalization technology, recommendation, and scalable content discovery technology. The realized content channel is commercial free as well as premium free, thus enables the user to watch program after program without commercial advertisement interruption. The program recommended to the user is obtained by a data mining engine which analyzes the user's past view history as well as the content pool and similar user's selections. For certain users, the only button in remote control that requires them to press is the power button to turn on TV and turn off at the end, as the content channel can guide the user to a world of favorable content and enjoy the experience without interaction to TV.

The disclosed systems and methods can also be extended to other devices with displays, such as cell phones, tablets, PCs, watches, and so on, to enable a unique user interaction experience. Other applications, advantages, alternations, modifications, or equivalents to the disclosed embodiments are obvious to those skilled in the art.

What is claimed is:

1. A method for a personalized video recommendation, comprising:
    detecting, by one or more hardware processors, a viewing activity of at least one user of a content-presentation device capable of presenting multiple video programs in one or more channels;
    representing, by the one or more hardware processors, user interests of the at least one user by using a topic model, including:
        performing visual and textual analysis to each video to generate a codebook for each video, and
        modeling a topic distribution of each video and a word distribution of each topic;
    discovering, by the one or more hardware processors, the user interests from user viewing histories;
    generating, by the one or more hardware processors, a personalized video list of personalized video contents based on the user interests;
    recommending, by the one or more hardware processors, the personalized video contents to the at least one user; and
    delivering, by the one or more hardware processors, the recommended personalized video contents to the at least one user such that the personalized video contents are presented on the content-presentation device;
    wherein discovering the user interests further includes discovering the user interests at different granularity as a mixture of topics by using a Markov chain to capture a time-varying property of interests and the topic model to calculate the topic distribution of each video using both textual and visual information; and
    wherein performing the visual analysis including:
        dividing each video into a plurality of shots,
        determining at least one keyframe of each shot, wherein each keyframe is represented by a plurality of local patches,
        detecting visual features from the keyframes of the plurality of shots, and
        generating a visual codebook for each video based on the visual features.

2. The method according to claim 1, wherein generating a personalized list further includes:
    generating a personalized list to maximize the recommendation accuracy by finding videos that most fit the user interests under constraints of coverage, diversity, and novelty.

3. The method according to claim 2, wherein:
    maximizing recommendation accuracy is mapped to find a set of videos $D^t$ with topic distribution the same to or as close as the topic distribution of the user's interests $X^t$, that is, minimizing the difference between P(topics|$D^t$) and P(topics|$X^t$), which is defined by:
    arg max Accuracy($D^t$)=arg min|P(topics|$D^t$)−P(topics|$X^t$)|.

4. The method according to claim 2, wherein:
    the coverage is used as a criterion to measure the ability of recommendation systems to cover less popular by using Gini Index.

5. The method according to claim 2, wherein:
    the diversity is used as a criterion to measure the dissimilarity between two recommended items to analyze the recommendation of a particular user.

6. The method according to claim 2, wherein:
    the novelty of an item is in proportion to its distance between the items in a user's context.

7. The method according to claim 1, wherein performing the textual analysis comprises:
    performing a filter step including stop words removal, synonym expansion, and stemming to generate a textual codebook for each video.

8. The method according to claim 7, wherein the codebook of each video is generated by combining the visual codebook and the textual codebook.

9. The method according to claim 1, wherein modeling the topic distribution of each video is using latent dirichlet allocation (LDA) topic model.

10. The method according to claim 1, wherein modeling the word distribution of each topic is using collapsed Gibbs sampling.

11. A system for a personalized video recommendation, comprising:
    a data storage configured to store video data and/or the metadata of the video data; and
    one or more hardware processors, memory, and one or more program modules stored in the memory and to be executed by the one or more hardware processors, the one or more program modules comprising:
    an interest representation module configured to represent user interests of the at least one user by using a topic model, including:
        to perform visual and textual analysis to each video to generate a codebook for each video, and
        to model a topic distribution of each video and a word distribution of each topic; an interest discovery module configured to:
            discover the user interests from user viewing histories, and
            discover the user interests at different granularity as a mixture of topics by using a Markov chain to capture a time-varying property of interests and the topic model to calculate the topic distribution of each video using both textual and visual information; and
    a recommendation generation module configured to generate a personalized recommendation list based on the user interests and to transmit the personalized recommendation list to the at least one user;
    wherein the interest representation module is further configured to:
        divide each video into a plurality of shots,
        determine at least one keyframe of each shot, wherein each keyframe is represented by a plurality of local patches,
        detect visual features from the keyframes of the plurality of shots, and
        generate a visual codebook for each video based on the visual features.

12. The system according to claim 11, wherein the recommendation generation module is further configured to:

generate a personalized list to maximize the recommendation accuracy by finding videos that most fit the user interests under constraints of coverage, diversity, and novelty.

13. The system according to claim 12, wherein:
maximizing recommendation accuracy is mapped to find a set of videos $D^r$ with topic distribution the same to or as close as the topic distribution of the user's interests $X^t$, that is, minimizing the difference between P(topics|$D^r$) and P(topics|$X^t$) and which is defined by:

$$\arg\max \text{Accuracy}(D^r) = \arg\min |P(\text{topics}|D^r) - P(\text{topics}|X^t)|.$$

14. The system according to claim 12, wherein:
the coverage is used as a criterion to measure the ability of recommendation systems to cover less popular by using Gini Index.

15. The system according to claim 12, wherein:
the diversity is used as a criterion to measure the dissimilarity between two recommended items to analyze the recommendation of a particular user.

16. The system according to claim 12, wherein:
the novelty of an item is in proportion to its distance between the items in a user's context.

17. The system according to claim 11, wherein:
for a new user, the interests are learned online as the new user watching the videos, while for an existing user, the interests can be calculated from the existing user's watch history and save to a database to avoid recalculating each time.

* * * * *